(No Model.) 2 Sheets—Sheet 2.
S. H. SHORT.
PROTECTING MOTOR MECHANISM OF ELECTRIC CARS.
No. 448,840. Patented Mar. 24, 1891.
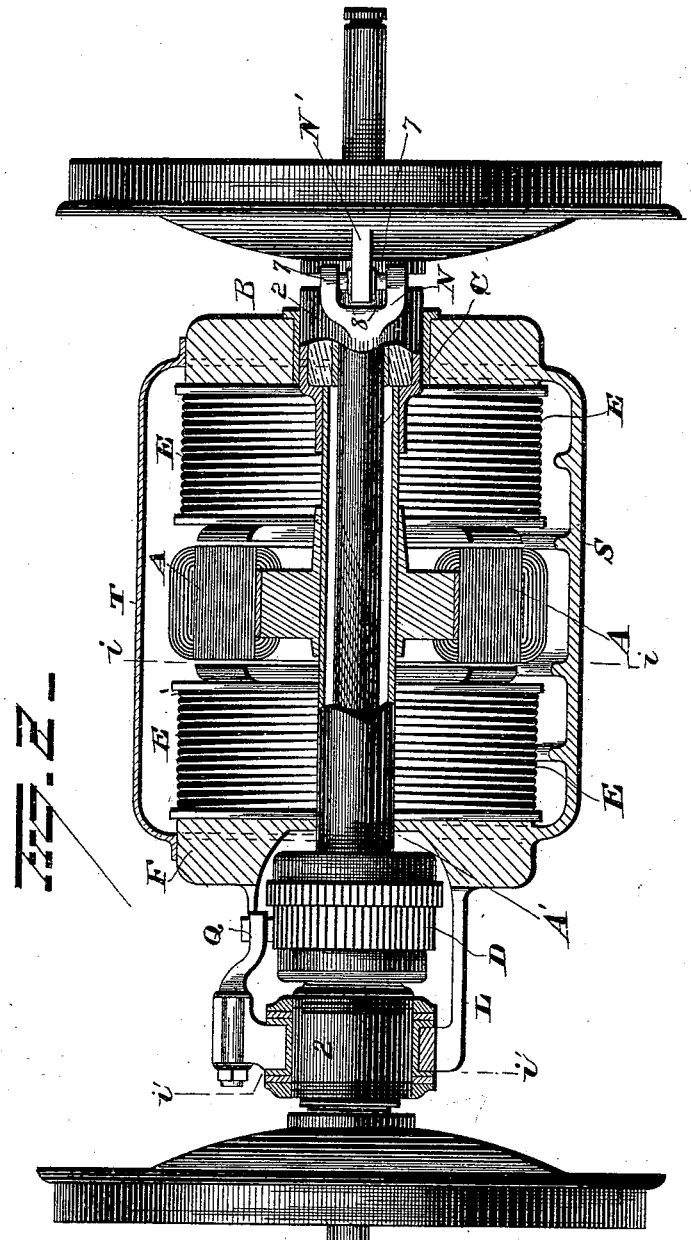

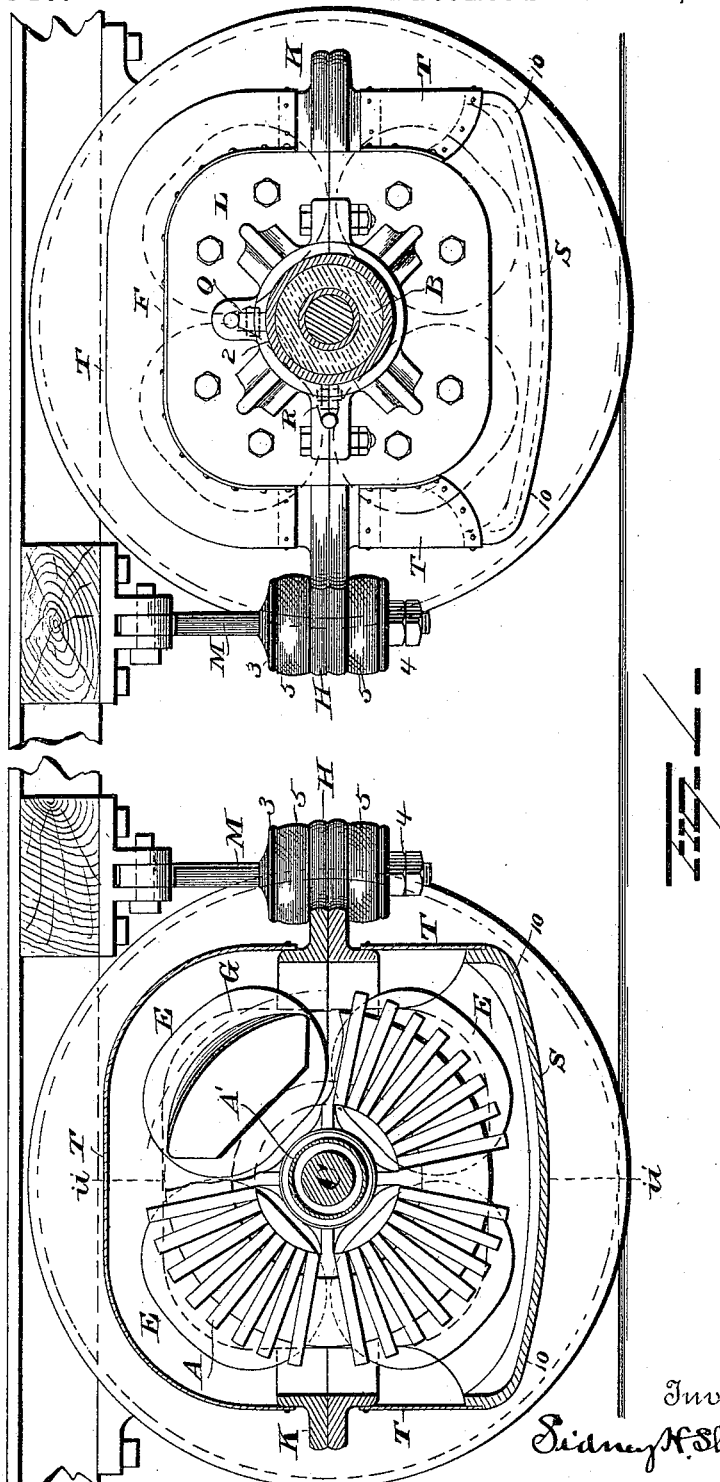

UNITED STATES PATENT OFFICE.

SIDNEY H. SHORT, OF CLEVELAND, OHIO, ASSIGNOR TO THE SHORT ELECTRIC RAILWAY COMPANY, OF SAME PLACE.

PROTECTING MOTOR MECHANISM OF ELECTRIC CARS.

SPECIFICATION forming part of Letters Patent No. 448,840, dated March 24, 1891.

Application filed November 15, 1890. Serial No. 371,509. (No model.)

*To all whom it may concern:*

Be it known that I, SIDNEY H. SHORT, of Cleveland, in the county of Cuyahoga and State of Ohio, have invented certain new and useful Improvements in Protecting Motor Mechanism of Electric Cars; and I do hereby declare the following to be a full, clear, and exact description of the invention, such as will enable others skilled in the art to which it appertains to make and use the same.

This invention relates more particularly to propelling mechanisms of electric cars, in which a propelling-motor has the armature axially placed with reference to a driving-axle and directly connected therewith. By "axially placed" is to be understood that the axes of the armature and the driving-axle are coincident, or nearly so. By "directly connected" is to be understood that the armature and driving-axle revolve together or with equal angular velocity. Each of the improvements constituting the said invention is, however, included for all the uses to which it may be adapted.

Some parts of the invention, it may be observed, are applicable to motors mounted on the driving-axle through the intermediary of a supporting-frame, with its armature connected with said frame by reducing-gear.

In accordance with the present invention, a pan is provided on the motor-frame, meaning thereby the non-rotating part which is hung on the car-axle and which in a motor comprising an axially-placed and directly-connected armature is composed of the field-magnet, yokes, and connections, and in the case of the ordinary-geared motor carries the field-magnets and more or less of the gearing. This pan protects the motor from dirt more effectually than a pan at some distance below the motor, as heretofore used. It is preferably cast in one piece with the motor-frame, or of a part thereof when said frame is made in two or more parts, thus securing lightness with rigidity and closeness, and avoiding the use of joints. Further, it is preferred to make the pan sufficiently strong to support the end of the car, so that if the car runs off the track this pan will effectually protect the machinery above it.

A further improvement consists in inclosing the motor by a casing on the motor-frame, so as to inclose the motor most effectually. It is preferred to make the casing of sheet-iron, which not only protects the motor inside from dirt, but also acts as a magnetic shield thereto.

In the accompanying drawings, which form part of this specification, Figure 1 is a partial view in sectional elevation of an electric car provided with the present improvements, the left half of said figure being in section on line $i$ of Fig. 2, with a part of the armature broken away, and the right half of said figure in section in a plane corresponding to line $i'$ of Fig. 2; and Fig. 2 is a cross-section on line $i\ i$ of Fig. 1.

In the form of motor shown the armature A is fast on a hollow shaft A', which surrounds a car-axle C with springs or buffers B of soft rubber interposed between in sockets 2 in ends of said shaft and the car-axle. The commutator D is also fast on said shaft A'. The field-magnets E project from yokes F and G at the sides of the armature A. The yokes are connected by arms H and K, and the yoke F has a bracket L. The field-magnets are mounted on the shaft A' by journal-bearings in the yoke G and bracket L, and are held from rotating by the connection M. This connection is a rod jointed to the car-floor and provided with a flange 3 and nuts 4, between which and the arm H are interposed the springs or buffers 5. A connection of any suitable form with any part of the car adapted to prevent the rotation of the field-magnets on the shaft A' might of course be used. The coupling shown for directly connecting the armature A with the car-axle C consists of the forks N on the armature-shaft A' and of the arms N' on a collar on the hub of a wheel P. Between the arms N' and the forks N are the spring-pads 7, of, say, soft vulcanized rubber, protected by metal caps 8. The play of the arms N' between the caps 8 permits the movement of the motor in the direction of the said arms, and the yielding of the spring-pads 7 permits transverse movements.

At Q and R are the commutator-brushes. To protect the motor, mounted as explained, a pan S is located on the motor-frame below the motor, said pan, as shown, being cast integral with the yokes F and G or (since these yokes are divided in horizontal plane) with the lower part of said yokes, it inclosing the field-magnets E and armature A. Being cast integral with the yokes F and G it of course makes a tight joint therewith and is not liable to become loose in use. The pan in use protects the motor against dirt or objects on the track, and it is made of sufficient strength to resist any object with which it is likely to come into contact, and even to support the weight of the car, should it be called upon to do so. The front and rear ends of the pan may be inclined upward on the bottom, as shown at 10, so that the pan may slide over the ground in case it should come into contact therewith, as by the car running off the track onto soft ground. Around the upper part and in the front and rear of the motor is a shield T, which, as shown, is composed of three parts fastened at the edges to the yokes F, arms H K, and pan S, and which makes in connection with them a close box for the motor, adapted to protect the latter effectually from mud and dust. As this box is fastened to the motor-frame, the joints may be made tight, no play between the box and the motor-frame being necessary. Sufficient clearance is of course left inside the box for the armature's rotation. The shield T is or may be made of iron and would tend therefore to screen the car from any stray lines of force from the magnets below. Practically it is designed to use sheet-iron for the shield T and to fasten it by screws to the motor-frame and pan S.

Instead of mounting the armature A and the field-magnets E on the hollow shaft A′, with springs B interposed, they may be mounted solidly on the axle, the shaft A′ and springs B and coupling N N′ 7 being omitted.

With the construction shown the pan S becomes an integral part of the field-magnet yokes, and is as effective as the portions F and G of the yokes, from which the magnet-cores and pole-pieces directly project. The pan S, therefore, in addition to its mechanical function as a protector for the motor against mud and dust, has also the magnetic function of a yoke for the field-magnets. The peculiar curved shape of the bottom of the pan adapts the same particularly for supporting the car in case of derailment, as it will not be easily broken or injured, as would be the case if the pan were rectangular, in which case the sharp edges or angles of the pan would dig into the ground whenever an accident occurs to the motor-car.

Having fully described my invention, what I claim as new, and desire to secure by Letters Patent, is—

1. The car-motor frame provided with a pan integral therewith, substantially as described.

2. The motor-frame comprising yokes from which field-magnets project and provided with an underlying pan integral with said yokes, substantially as described.

3. A car-motor frame formed by the yokes of an electric motor, with a pan constituting an integral part of the yokes and extending below the space for the armature and field-magnets, substantially as described.

4. A car-motor frame formed by the yokes of an electric motor, with a pan constituting an integral part of the yokes and extending below the space for the armature and field-magnets, in combination with a casing secured to the yokes, substantially as described.

5. A car-motor frame formed by the yokes of an electric motor, with a pan constituting an integral part of the yokes and extending below the space for the armature and field-magnets, in combination with a magnetic casing inclosing the whole motor and secured to the yokes, substantially as described.

6. The combination, with a car and an electric motor for propelling the same mounted on a driving-axle and extending below the same, of a protecting pan below the motor and curved in the direction of the travel of the motor-car, substantially as described.

7. The combination, with a car and an electric motor mounted on the car-axle and extending below the same, of a pan below the motor and constituting an integral part of the yokes of the field-magnets and curved in the direction of the travel of the car, substantially as described.

In testimony whereof I have signed this specification in the presence of two subscribing witnesses.

S. H. SHORT.

Witnesses:
A. B. CALHOUN,
C. J. LEEPHART.